United States Patent [19]
Miller

[11] 3,868,690
[45] Feb. 25, 1975

[54] LORAN RECEIVER ENVELOPE-CYCLE DISCREPANCY COMPENSATION

[75] Inventor: Herbert E. Miller, Brookline, Mass.

[73] Assignee: Epsco, Incorporated, Westwood, Mass.

[22] Filed: Apr. 13, 1973

[21] Appl. No.: 350,996

[52] U.S. Cl.......................... 343/103, 235/150.272
[51] Int. Cl............................................... G01g 1/26
[58] Field of Search............... 343/103; 235/150.272

[56] References Cited
UNITED STATES PATENTS
3,736,590  5/1973  Lipsey et al. ..................... 343/103

Primary Examiner—T. H. Tubbesing
Assistant Examiner—Richard E. Berger
Attorney, Agent, or Firm—Weingarten, Maxham & Schurgin

[57] ABSTRACT

In a Loran C receiver, method and apparatus of providing cycle tracking of received master and slave transmissions on a predetermined cycle identified from a predetermined Loran pulse envelope point which is compensated for envelope-cycle discrepancies in the received signals. A threshold detection system senses a hypothetical "third cycle" point on Loran C pulses and thereby identifies the cycle which is to be tracked. Envelope-cycle variations in received signals which prevent coincident occurrence of predetermined cycle and envelope points are adjusted in response to estimated or measured position to bring the predetermined cycle and envelope points into coincidence and thus reduce the possibility of cycle tracking at the wrong cycle.

16 Claims, 16 Drawing Figures

FIG. I

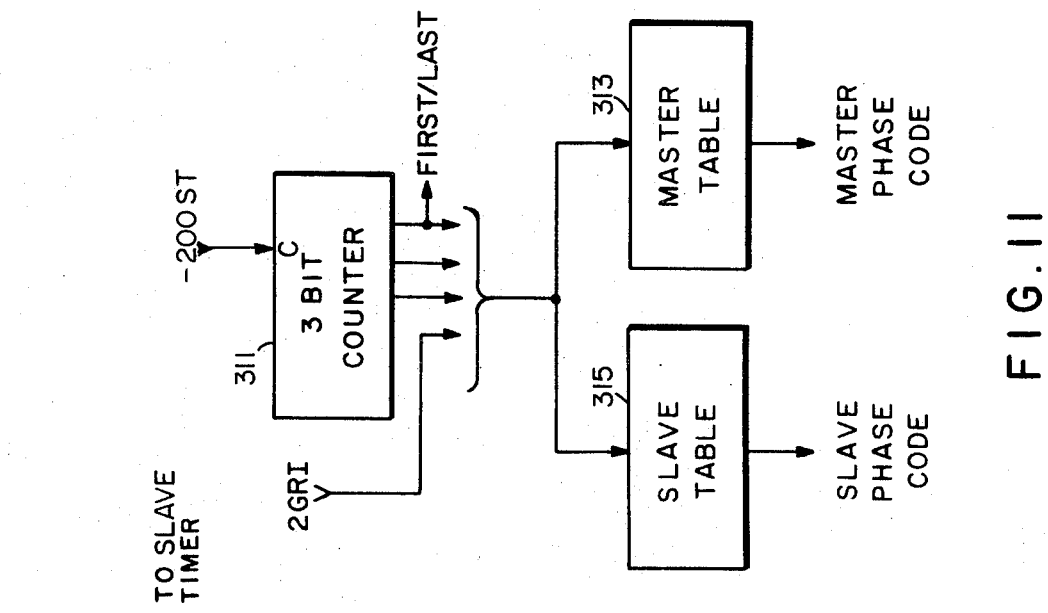
FIG. 11
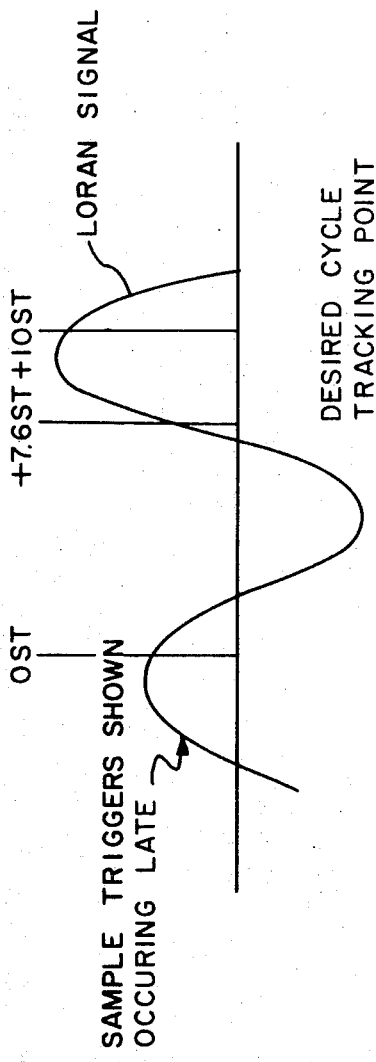
FIG. 9
FIG. 10A
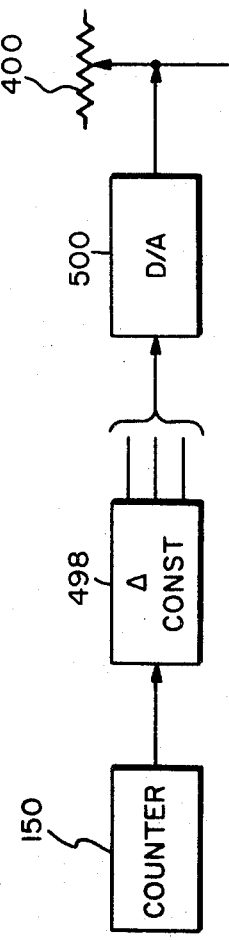
FIG. 10

LORAN RECEIVER ENVELOPE-CYCLE DISCREPANCY COMPENSATION

FIELD OF THE INVENTION

This invention relates to method and apparatus in a Loran C receiver for minimizing the possibility of cycle tracking of master and slave transmissions at non-corresponding cycles.

BACKGROUND OF THE INVENTION

The Loran C navigation system operates to transmit carrier bursts sequentially from a master and several slave stations and with a predetermined envelope shape and timing between bursts. Loran C receivers operate to detect timing differences at the point of reception in order to establish at least two intersecting hyperbolic lines of position which define the locaton of the receiver.

The detection of the difference in timing typically operates by timing the interval between corresponding points on the master and one slave station. That point is generally referred to as the third cycle in each carrier burst. Once the correct cycle is identified, it is possible to synchronize the Loran C receiver to the zero crossing, but identification of the correct cycle typically depends upon consistently locating the same envelope point.

Assuming that the same envelope point can be consistently located for identifying the appropriate cycle, a further problem of envelope cycle discrepancy operates to introduce error in the cycle identification due to variations in carrier and envelope delay. These variations which depend upon position can reach nearly plus or minus half cycle over the area of use of the chosen set of Loran stations and thus can lead to erroneous cycle identification.

BRIEF SUMMARY OF THE INVENTION

In accordance with the method and apparatus of the present invention, a Loran C receiver operates to compensate for the envelope-cycle delay variations in identifying the proper cycle for use in detecting the time difference between master and slave stations. The envelope and cycle variations are plotted as a function of position for the master and slave stations and an envelope detector circuit within the Loran C receiver is adjusted, either through manual controls or an automated control loop, to adjust the sought envelope point as a function of position.

Once this correction has been made, a further control loop in the receiver maintains exact correspondence between the point of the envelope which is detected and the cycle zero crossing to prevent noise or other disturbances from upsetting the stability of the cycle tracking.

BRIEF DESCRIPTION OF THE DRAWINGS

These and other features of the invention will be more fully presented below in the detailed description of the preferred embodiment, presented for purposes of illustration and not by way of limitation, and in the accompanying drawings of which:

FIG. 9 is a slave station cycle track system diagram;

FIG. 10 is a diagram of modification for automated envelope-cycle discrepancy control; FIG. 10A is a related waveform;

FIG. 11 is a diagram of logic for generating preknown station phase codes;

DETAILED DESCRIPTION OF THE PREFERRED EMBODIMENT

Figure 1:
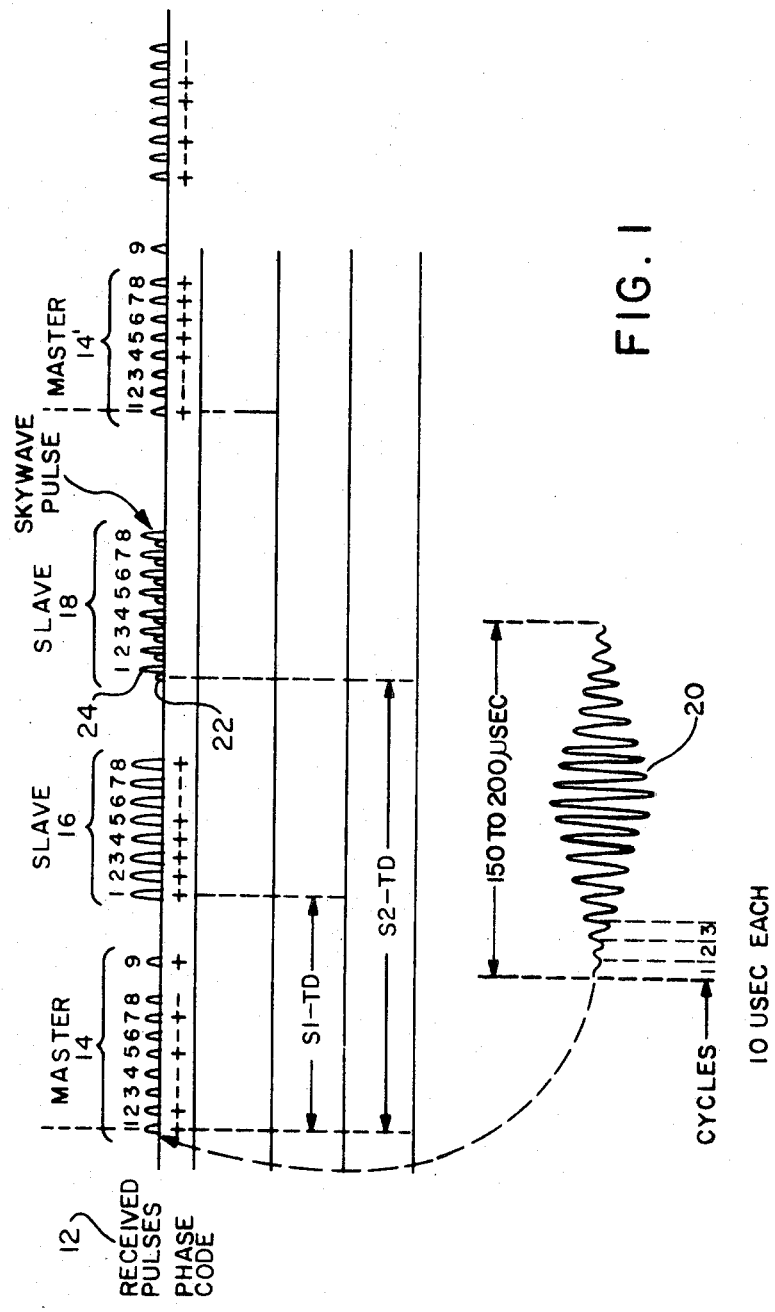
FIG. 1 is a Loran C timing diagram useful in explaining the setting for the invention.

An understanding of the principles of Loran C may be seen by reference to FIG. 1. Shown there is a sequence 12 of received pulses comprising a set of nine master pulses 14, and first and second sets 16 and 18 of slave pulses from separate slave transmitters. The interval between the beginning of a set of master pulses 14 and a subsequent set 14' is one group repetition interval (GRI).

In Loran C, each pulse in the sets 14, 16 or 18 typically comprises a carrier burst 20 of 100 $KH_z$ oscillations with an increasing and decreasing (i.e. triangle wave) amplitude modulation envelope. Each pulse or burst 20 lasts for approximately 150–200 microseconds and is separated, one from the other in each set by 1 millisecond. There are nine pulses in the master set 14, the ninth being separated from the remainder by 2 milliseconds, while in the slave sets 16 and 18, there are only 8 pulses.

As shown in the set 18, it is possible that received transmissions from a Loran C station may include a set of groundwave pulses 22 followed by a set of skywave pulsed 24, generally delayed in times from the groundwave pulse by up to a substantial fraction of a millisecond.

In order to identify the master set 14 and distinguish it from the slave sets 16 and 18, a phase code is established for the first eight pulses in each master set 14. A typical phase coding is indicated directly below the pulses in sets 14 and 14' by the designations plus (+) and minus (−) to represent the phase of the 100 $KH_z$ carrier oscillations in the corresponding pulse. A typical slave phase code is shown also.

In the theory of operation for Loran C, a hyperbolic line of position is defined by the variation at the receiver in the timer interval between the transmission of corresponding points on each pulse of a master and one slave set. Two lines of position are defined by the time difference variations between a master and the two slaves indicated in FIG. 1, and generally the intersection of these lines of position will provide a position fix of high accuracy.

The actual time intervals S1-TD and S2-TD in FIG. 1 measured at the receiver, will include a standard time difference which is the time difference established by the transmission sequencing between the master and slave stations, and a further time variation component (positive or negative which defines the hyperbolic line of position. It is the object of a Loran C receiver to determine the S1-TD and S2-TD values for pulses transmitted typically by at least a master and two slave stations. These are sufficient in most cases to provide intersecting lines of position and a position fix. Certain corrections may be desired in addition to the actually measured time interval values due to local aberrations or transmission inconsistencies. These are generally provided from tabulations and may be used by vessel operators to establish corrections based upon approximate location or other factors.

Figure 2:
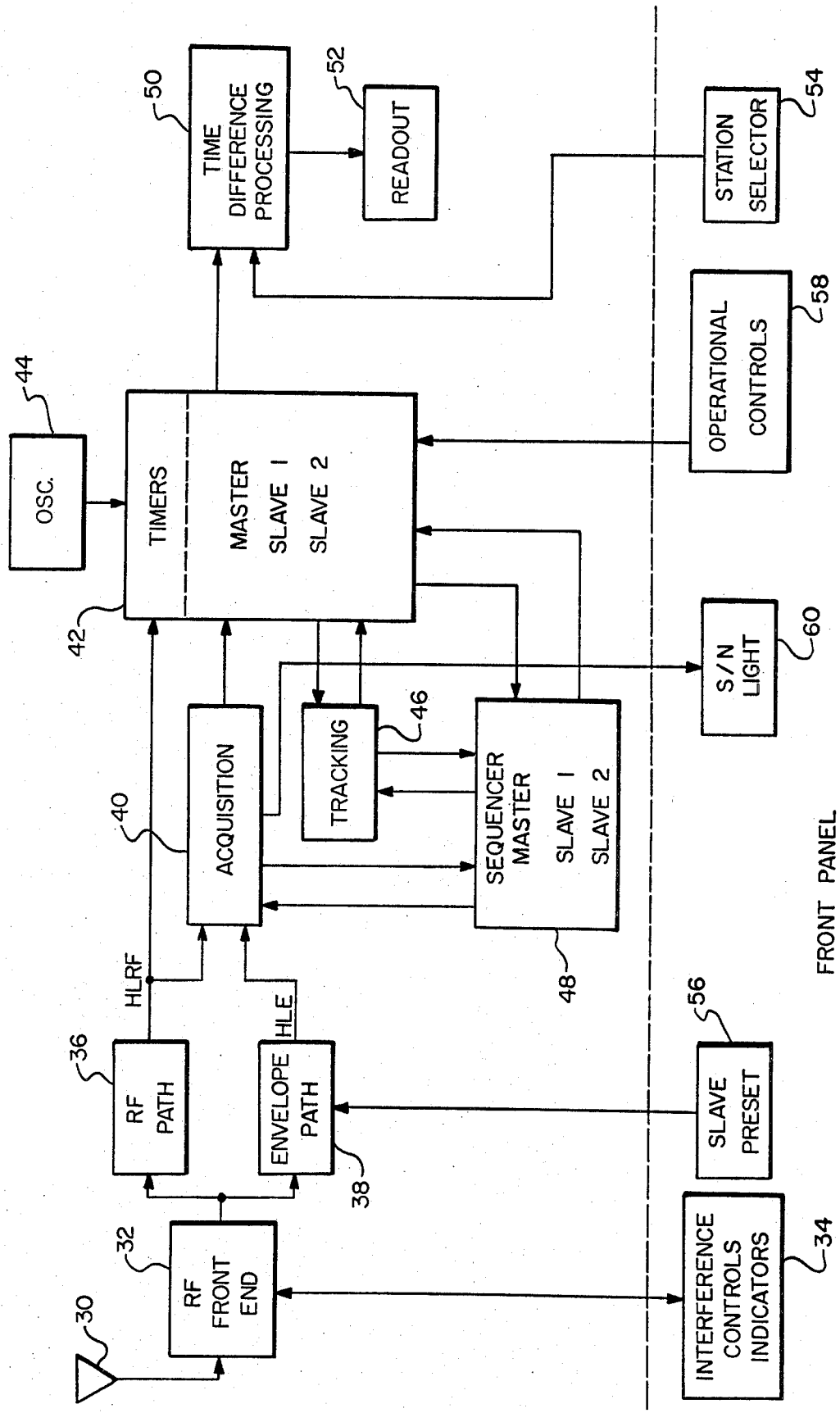
FIG. 2 is a general block diagram of the receiver of the present invention.

In accordance with the Loran receiver of the present invention, a simplified, conceptual block diagram is presented in FIG. 2 as a guide to understanding the operation and automation of the present receiver. From an antenna 30, the 100 $KH_z$ signals received from the Loran broadcasts are applied to an RF amplifying and signal processing front end 32. Interference monitoring and filtering in the front end 32 are displayed or controlled by interference controls and indicator system 34 on the front panel. This system 34 provides bandwidth control, as well as specific band elimination for interference suppression, and provides an indication of CW interference in the received Loran signal. The filtered output of the RF front end 32 is applied to a radio frequency signal path 36 and an envelope detection path 38. The output of the radio frequency path 36 is a hard limited RF, or essentially squarewave signal corresponding to the received Loran carrier signals. The output of the envelope path 38 provides a hard limited envelope signal which has a zero crossing at a predetermined point typically referred to as the third cycle point to identify the hypothetical third cycle in each received pulse so that the third cycle can be tracked at its zero crossing to permit measurement of the variation in time of reception.

The outputs of the radio frequency and envelope paths 36 and 38 are applied to an acquisition system 40, and the hard limited RF signal is applied to a system 42 of timers which includes separate timers for the master and two slave signals.

An oscillator 44 provides a basic 10 $MH_z$ signal to the timers system 42 for use in establishing predetermined time intervals within the timers. A tracking system 46 also operates in a loop with the timers system 42 to cycle track the received master and slave carriers. A sequencer 48 establishes a predetermined sequence of events in the operation of the receiver such as acquisition, cycle identification and tracking functions and identifies the time periods for reception of the master and slave stations once acquisition has been achieved.

In operation, the acquisition system 40 operates to correlate the incoming signals with the phase code for the master signals and to identify the time during which the master pulses are received. The acquisition system 40 also automatically identifies predetermined cycle and envelope positions on the received signals (so called third cycle points) in order to establish specific times in the master and slave pulse sets for measuring the difference in time of reception. The tracking system 46, once acquisition and identification of the third cycle points on the received waveforms have been achieved, provides automatic tracking of the master and slave third cycle zero crossing during receiver operation. The timers system 42 defines predetermined time positions which are useful throughout the receiver system for sampling the received signals during acquisition and tracking, and also provides signals to a time difference processing system 50 wherein digital representations of the variations in time interval at the receiver, representative of vessel position, are produced and applied to a readout display 52. The particular slave station of the two available for which the variation in time interval is measured is selected from a front panel selector system 54.

A slave station preset correction control 56 is also provided on the front panel in order to insert into the envelope path 38 predetermined corrections in the envelope signal zero crossing to reflect known envelope-cycle discrepancies representative of vessel position. Operational controls 58 are also provided on the front panel and adjust the timers system 42 for such variables as manual or automatic functions, master and slave station identifications and phase codes. Finally, a signal-to-noise ratio indicator light 60 is provided on the front panel and is operated by the acquisition system 40 in a wideband mode of reception to provide an indication of unreliable signal reception when a predetermined confidence level in received signal is not present.

In understanding the specific implementation of the present invention to provide advanced Loran C receiver automation, reference will be made to a more detailed circuit block diagram and operational sequence diagram in FIGS. 3 and 4, respectively, and to FIGS. 5–13 which illustrate specific implementation of the FIG. 3 elements.

Figure 3:
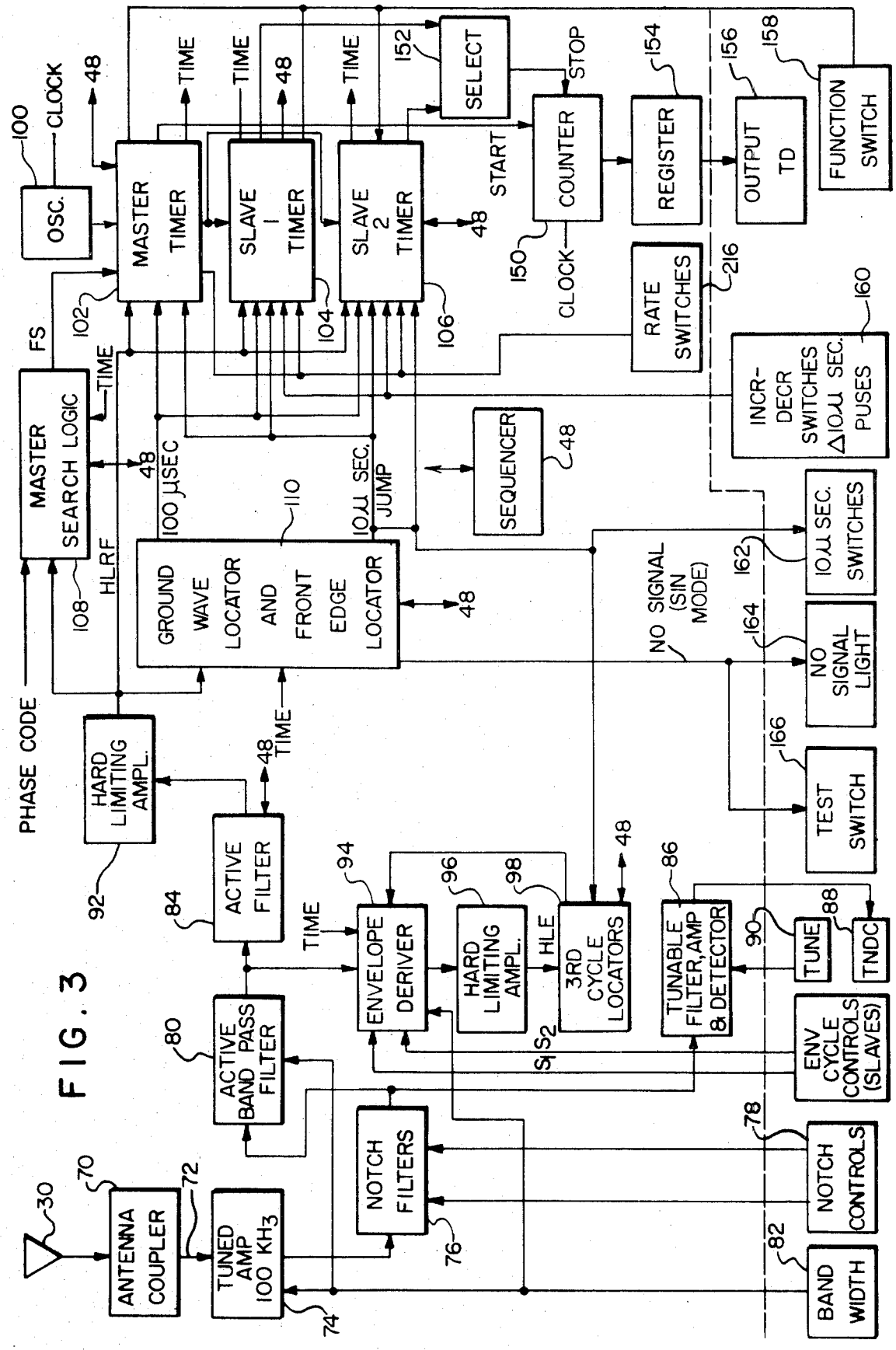
FIG. 3 is a more fully presented block diagram of the receiver of the present invention.

In FIG. 3, the received 100 $KH_z$ signals from the antenna 30 are applied to an antenna coupler 70 placed adjacent to the antenna 30 to provide low-loss coupling and transmission through a cable 72 from the antenna location to the position of the actual receiver. On entering the Loran C receiver, the received signals pass through a tuned RF amplifier 74. The output of the tuned amplifier 74 is applied to one or more notch filters 76. Preferably there are two notch filters which are controlled from the front panel by notch filter controls 78 to adjust the frequencies eliminated from the signal path. The notch filters 76 may be manually tuned by the operator to eliminate specific narrow frequencies within approximately 30 $KH_z$ of the 100 $KH_z$ carrier frequency so as to improve the signal-to-noise ratio. The output of the notch filters 76 is applied to an active bandpass filter 80 which is controlled by a bandwidth control 82 on the front panel. In the narrowband position the active bandpass filter 80 provides an approximate 8 $KH_z$ bandpass, while in the wideband position it provides an approximate 18 $KH_3$ bandpass. The 18 $KH_z$ bandpass in the wideband position is provided by the bandpass of an active filter 84 which receives the output of the active bandpass filter 80. The active bandpass filter 80 is also triggered into a similar narrowband mode by the sequencer 48 during the master search, front edge, and groundwave location functions to be explained below.

To aid in locating and eliminating interference in the band of frequencies from approximately 70 $KH_z$ to 130 $KH_z$, the output of a notch filter 76 is applied to a tunable filter, amplifier, and detector system 86 which has a signal output applied to a front panel indicator 88, and is tuned by a front panel tuning control 90 to select a narrow portion of the frequency range. The location of undesired signals in that frequency range can be detected by readings on the meter 88 in conjunction with the tune of the control 90, and the notch controls 78 can be adjusted to minimize the interference in those specific frequency ranges. It is to be noted that more or less than two notch filters may be used as desired. It has been found that two filters provide a desirable degree of interference elimination and flexibility at reasonable cost.

The output of the active filter 84 is applied to a hard limiting amplifier 92 which provides a hard limited RF output, essentially a squarewave having zero crossings substantially coincident with the zero crossings in the original 100 $KH_z$ carrier.

The output of the active bandpass filter 80, which serves as the input to the active filter 84, is also applied to an envelope deriver circuit 94 which provides a signal output having an envelope zero crossing at a predetermined point on the pulse envelope, typically known as the third cycle point, though in practice it more nearly approaches the sixth cycle of the carrier signal as received at the antenna. The output of the deriver 94 is applied to a hard limiting amplifier 96, which provides a hard limited envelope output signal for use by the third cycle locators 98.

The remainder of the circuitry in FIG. 3 is primarily operative to synchronize local time as provided by an oscillator 100 through a master timer 102 to first and second slave timers 104 and 106, such that the timers 102, 104 and 106 indicate time of reception of corresponding points on the pulse sets 14, 16 and 18 for the master signals and slave signals of FIG. 1. To achieve this synchronization, a master search logic system 108 is initially activated to identify the pulse set 14 of the master signal and to begin the process of synchronizing the master timer 102 to the time period of the group repetition interval (GRI) during which the set 14 of master pulses is received. With the master located, specific points on the received master pulses are determined by a groundwave locator and front edge locator 110 to establish a rough synchronization of the master timer 102 and slave timers 104 and 106 with predetermined portions of the incoming master and slave pulses. For this purpose, 100 microseconds and 10 microsecond jumps are produced in the timers 102, 104 and 106 by the groundwave locator and front edge locator 110. Finally, in the third cycle locators 98, the specific RF carrier signal zero crossing point corresponds to a preset envelope position of the pulse for the master and slave signals, is located and tracked. At this point, cycle tracking circuitry provides a phase lock on this timing.

Figure 4:
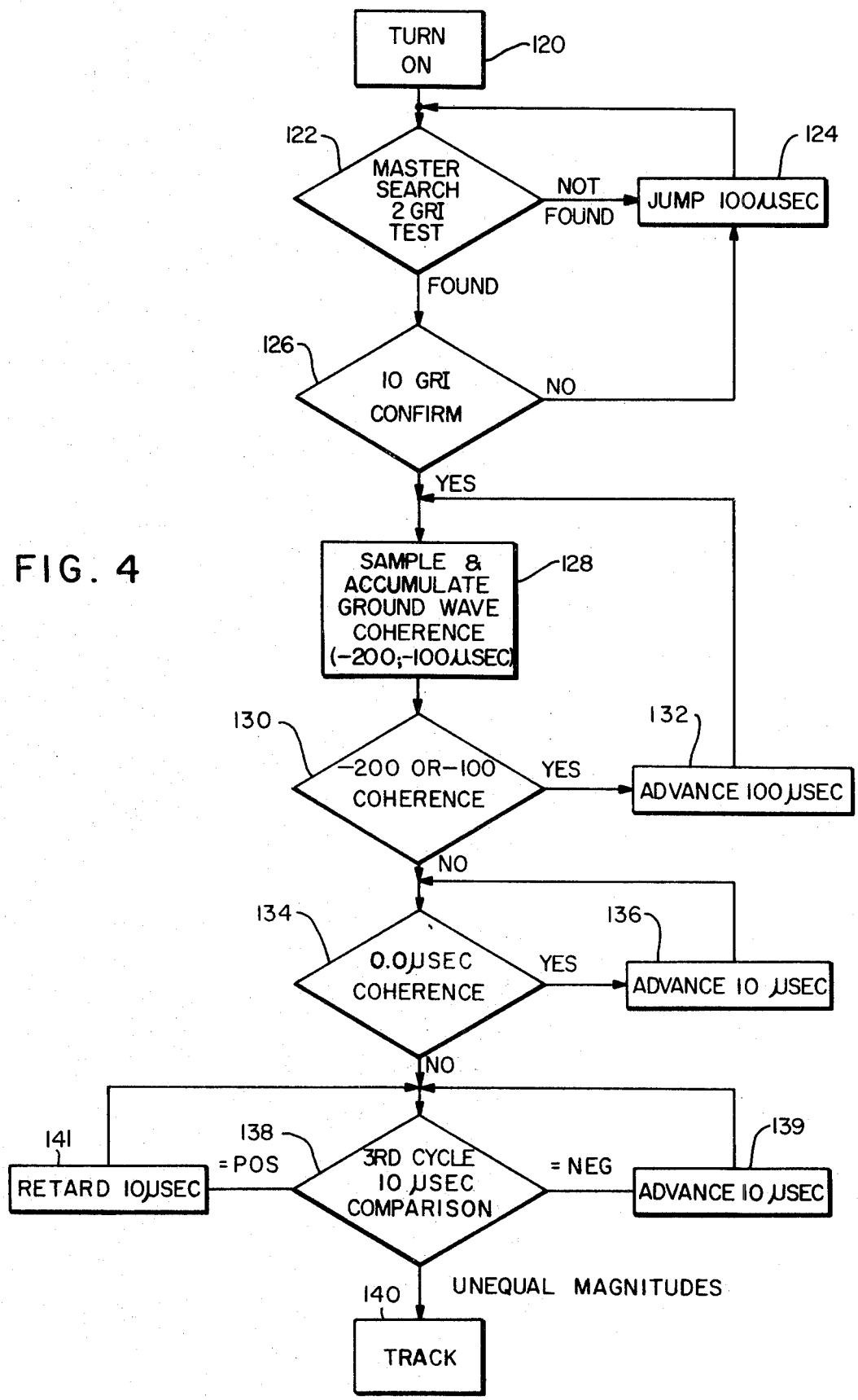
FIG. 4 is a sequence of operation diagram useful in understanding the invention.

The scheduling and proper time sequencing of these several operations in acquisition and tracking functions are controlled by the sequencer 48 which operates with the active filter 84 master search logic 108, groundwave locator and front edge locator 110, third cycle locators 98 and timers 102, 104 and 106 in accordance with the FIG. 4 flow chart. For this purpose, the sequencer 48 may be of standard digital design such as a state counter which steps through various states that are decoded and used to gate the operation of and signal flow between the various elements as will be clear from the detailed descriptions below.

With reference to FIG. 4, the operation and design of the sequencer 48 to control the sequencing between the various operations of acquisition and tracking can best be understood. From an initial turn-on condition 120, a master search test 122 is entered which conducts a correlation between the phase code entered for the given master station and the incoming pulse signals 12 for a 2 GRI period to locate the occurrence of the master pulse set 14. If there is no correlation indication of having found the master pulses, an operation 124 jumps the search timing by 100 microseconds and recommences the search and test 122. If an initial indication of a master signal is generated in the 2 GRI first level of search, a test 126 is entered in which a confirming, second level search test for the master signal is conducted over a 10 GRI period. In the event of negative results from test 126, the 100 microsecond jump operation 124 is executed whereas a positive confirming test leads to an operation 128 which commences a rough synchronization by sampling and accumulating groundwave coherence at 200 and 100 microsecond positions in advance of the then estimated zero sample time (zero ST) for the hypothetical third cycle zero crossing. A test 130 determines whether there is coherence at these (−) 200 or (−) 100 microsecond sample times over a predetermined interval. If there is coherence, indicating that portions of the pulse occurred either 100 or 200 microseconds in advance of the sample point, an operation 132 advances the sample point by 100 microseconds. The operation 128 is then recommenced. The purpose of this loop is to locate the earliest point, within 100 microseconds, at which an identifiable Loran pulse is received. This insures as nearly as possible that a groundwave rather than skywave signal will be processed.

If the test 130 indicates that no coherent information is present at 100 or 200 microseconds in advance of the zero ST point, then it is estimated that the sampling time is advanced as far to the front of the received pulse as is possible using this adjustment technique. A subsequent decision 134, which is part of the front edge locating system, tests for coherence at the 0.0 microsecond sample time. Since it is desired, according to the scheme of the present receiver, as will be made clear below, to track at plus 7.6 microseconds, the existence of coherence at the 0.0 sample time indicates that the sampling point may be advanced by 10 microseconds. If coherence is found in the 0.0 ST test, a subsequent test 138 is entered, which is part of the third cycle location function. In this test, the polarity of the hard limited envelope HLE signal is tested at two 10 microsecond separated points. The HLE signal is a summation of the carrier and carrier with envelope derivative. If these points span the third cycle zero crossing point, an unequal polarity will result at each point and the receiver will then enter a tracking mode operation 140. If the polarities are equal and negative, the sampling point is too late and an operation 139 advances the sampling by 10 microseconds. Similarly, for equal positive polarities, the sampling point is retarded by 10 microseconds in an operation 141.

Returning to FIG. 3, it is assumed that the master timer 102 and slave timers 104 and 106 have been adjusted to the accurate tracking mode in accordance with the acquisition and tracking sequencing of FIG. 4. The sampling time outputs of these timers will then indicate the difference in reception time between the pulses for the master and two slaves. A predetermined portion of the difference in these sample times corresponds to the interval between transmission times for the master and slave stations in the FIG. 1 sequence. This may be adjusted by any conventional digital subtraction or differencing techniques. The points of zero sampling time from the master timer 102 are employed to start a counter 150, which accumulates at the rate of the 10 MH$_z$ oscillator 100. A counter stop signal is provided from a selector system 152 which is in turn fed the zero sampling time signals from slave timers 104 and 106. The specific slave timer sampling time selected as a stop signal is chosen by a function switch on the front panel. The resulting accumulation in counter 150 is applied to a register 154 acting as a memory and its value is visually indicated in a digital output display 156, which indicates the actual time interval between the master and slave signals adjusted for the predetermined difference in transmission time between the two stations.

Additional front panel adjustments give the operator further control over the signal processing and permit him to take advantage of prior knowledge of his approximate location or other conditions such as variations in master and slave transmission characterisitcs. In particular, the function switches 158 permit identification of the specific slave stations being sought on the basis of the expected time differences for the two slaves from his location. The operator is also permitted to intervene through the increment-decrement switches 160 which provide 10 microsecond changes in the synchronization of the slave timers 104 and 106, and for this purpose provide pulses in a sequence at different, selectable rates.

In the wideband mode of receiver operation, during normal tracking, a no-signal light 164 is activated through the front edge locator system 110, then operating as a signal-to-noise detector, when a predetermined threshold of signal coherence is absent. A test switch 166 permits verification of the operation of the no-signal indication.

It will now be appropriate to consider in detail the circuit implementation in each of the blocks in the FIG. 3 diagram which provide the master search logic, envelope deriving function, third cycle location, groundwave and front edge location, and timer functions.

The timers 102, 104 and 106 are synchronized to the received master and slave signals to provide time-marked signals representative of time of reception of the various master and slave signals for defining hyperbolic lines of position. They are described with reference to FIG. 5, which illustrates the timer configurations for both master and slave timers.

A time division chain is provided for the 10 MH$_z$ signal from the oscillator 100. Pulse add and subtract modules 200 and 202 are on the slave timers only, not on the master timer, to provide 0.1 microsecond advance and retard action of the timing as will be shown below from the slave cycle tracking logic. The 10 MH$_z$ signal out of the pulse subtract module 202 is applied to a decade divide circuit 204 and in sequence to a second decade divide circuit 206. The 1 microsecond interval pulses between the circuits 204 and 206 are applied to a sample trigger generator 208 to be described below. The output of the decade divider 206 is applied to an OR gate 210 along with 10 microsecond jump signals from the front edge locator 110, 10 microsecond jump switches 162 on the front panel and third cycle locators 98. The output of the OR gate 210, representing 10 microsecond interval pulses, is applied to the trigger generator 208 and to a further decade divider 212 which provides 100 microsecond output interval pulses to an OR gate 214. The OR gate 214 also receives 100 microsecond jump signals from the groundwave locator 110 as well as a specific rate jump jump from rate switches 216 on the front panel in FIG. 3. The 100 microsecond interval pulses from the OR gate 214 are applied to a further decade divider 218 and to the sample trigger generator 208. 1 millisecond interval pulses from the divider 218 are applied to a further divider 220 and to sample trigger generator 208. The output of the decade divider 220 is applied to an OR gate 222 which also receives similar interval rate signals from the basic rate switches 216. The output of the OR gate 222, 10 millisecond interval pulses, is applied to a further decade divider 224 and also to the sample trigger generator 208. The output of the divider 224 represents a pulse interval corresponding to 1 GRI. It is applied to a divide-by-two circuit 226 to provide a 2 GRI signal, a divide-by-three circuit 228 to provide a 3 GRI signal, and the sample trigger generator 208. The output of the divide-by-two circuit 226 is applied to a decade divider 230 to provide a 20 GRI interval pulse and this signal is, in turn, applied to a 10 microsecond delay circuit 232 to provide a 20 GRI signal delayed by 10 microseconds. The 10 microsecond delay is determined by the 10 microsecond pulse intervals from the gate 210 which are applied to the delay circuit 232. The output of the divide-by-three circuit 228 is applied to a divide-by-two circuit 234 and provides at its output a 6 GRI interval pulse train. A further divide-by-sixteen circuit 248 marks a 320 GRI interval from the 20 GRI pulse intervals at divider 230.

Within the sample trigger generator 208, a number of delay and divider circuits, such as circuit 228, 232 and 234 are provided to establish in addition to an output signal at zero sample time corresponding to the 1 GRI pulse, a signal on a line 236 advanced 200 microseconds from the zero sample time, a signal on a line 238 advanced 100 microseconds from the sample time, the zero sample time signal on line 240, a signal on a line 242 retarded 2.6 microseconds from the zero sample time and signals on lines 244 and 246, respectively, retarded 7.6 and 10 microseconds from the zero sample time. The same trigger generator also provides sequential phase code signals for the corresponding master or slave station by logic tables within the generator 208 as shown below in FIG. 11.

Figure 5:
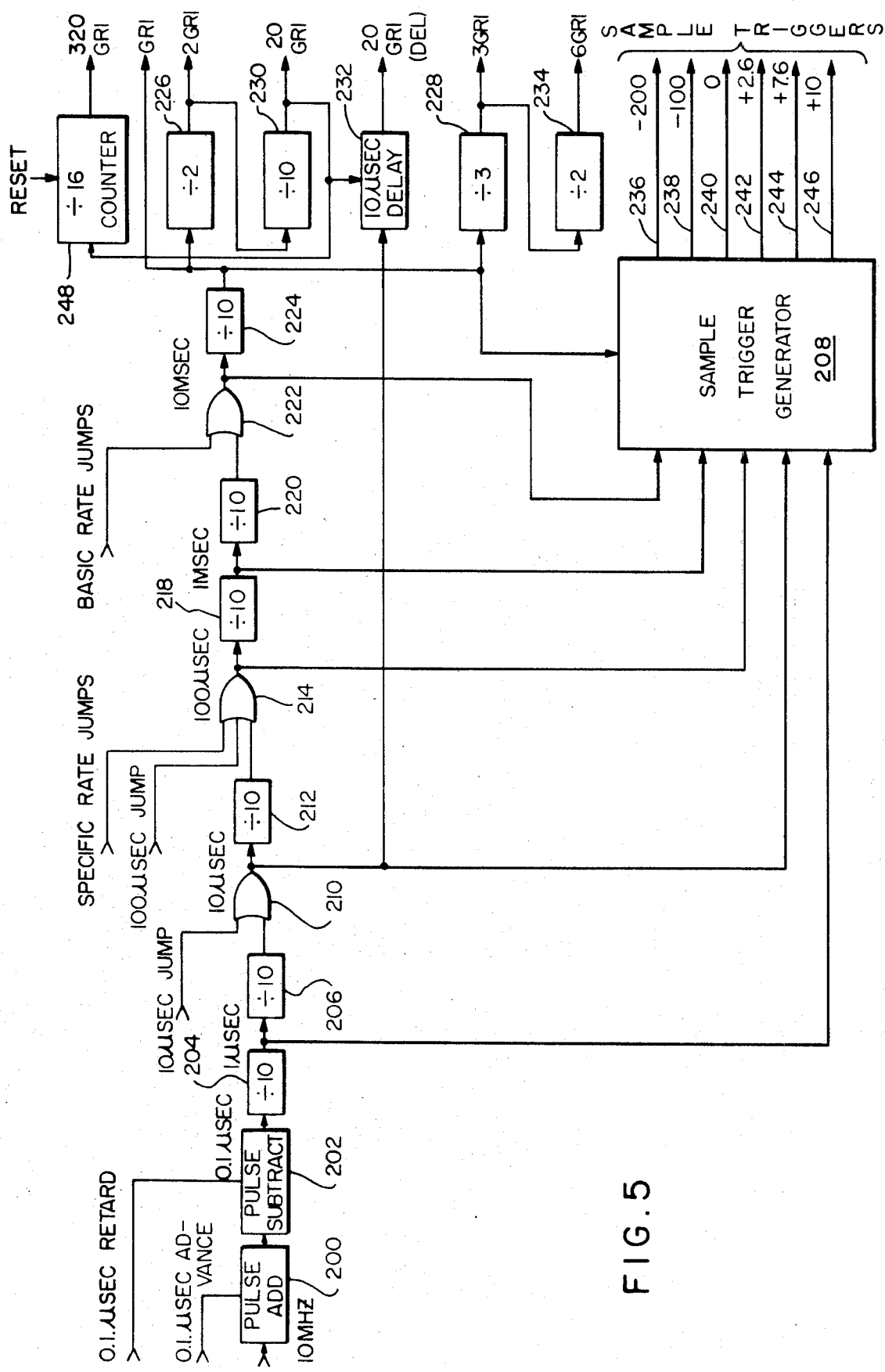
FIG. 5 is a diagram of the timers of FIG. 3.

The various time intervals defined on the output lines by timer circuitry of FIG. 5 are applied throughout the Loran receiver as will become apparent in the detailed description of the circuit components presented below.

Figure 6:
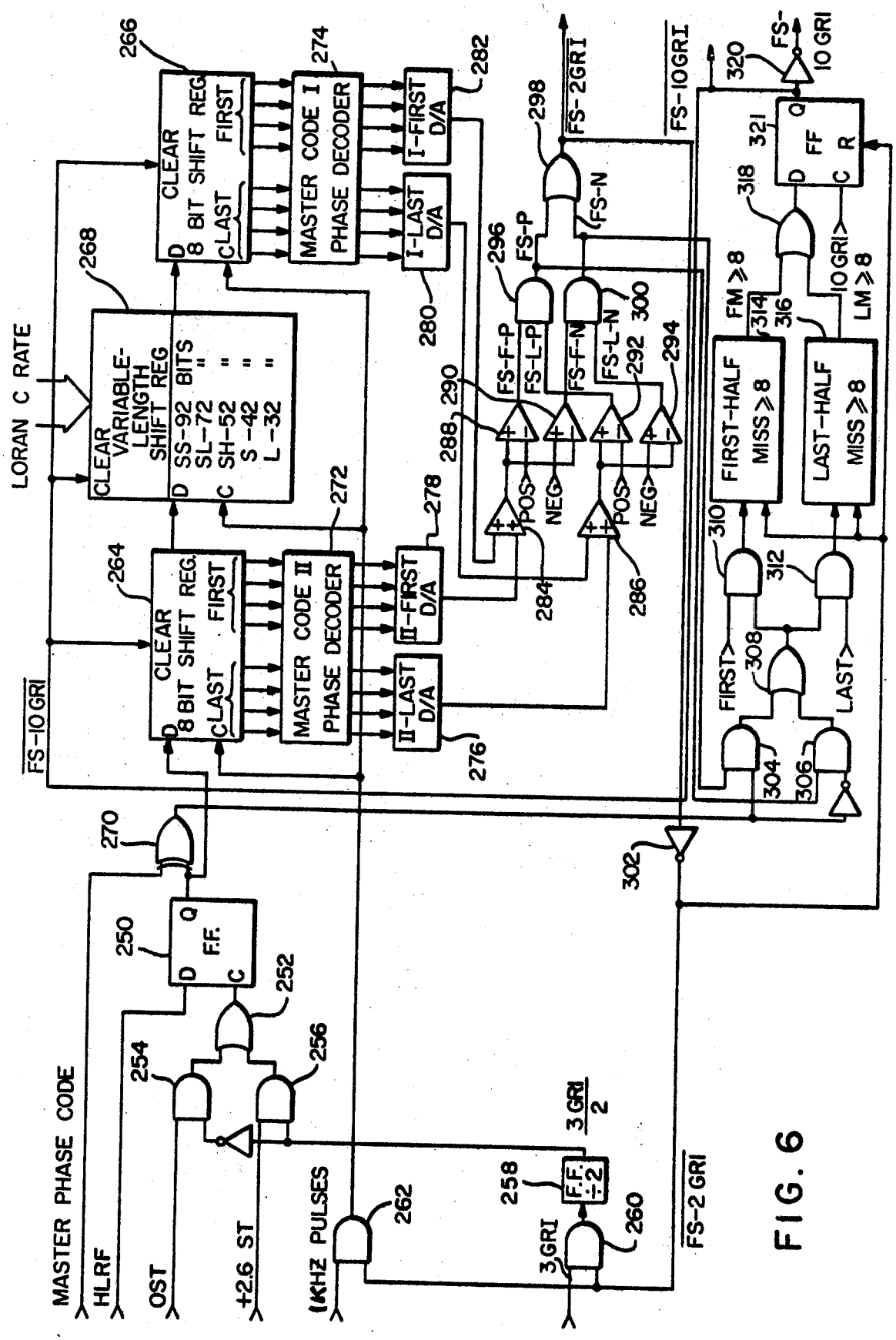
FIG. 6 is a diagram of the master search logic according to FIG. 3.

Once the receiver has been turned on, the master search routine is the first automatically operative receiver function and accordingly this logic as shown in FIG. 6 is described next. The function of the master search logic is to provide a first pass, 2 GRI attempt to locate the master signal and if it appears that the master signal is found, a second pass 10 GRI confirmation test is made. If either test fails, a 100 microsecond jump is made in the master timer and the process of search for the master signal pulses is repeated from the 2 GRI preliminary trial. All inputs representing time in the FIG. 6 diagram are taken from the master timer.

Quadrature sampling of the hard limited RF signal at the zero sampling time and plus 2.6 sample time is employed because of the random phasing between the receiver and received signals at turn-on. For this purpose, the hard limited RF signal is applied to the conventional data or "D" input of a flip-flop 250. The clock or "C" input for the flip-flop 250 is provided from an OR gate 252, which has its respective inputs from AND gates 254 and 256. The 0.0 ST and plus 2.6 ST signals are applied respectively to inputs of the AND gates 254 and 256. The other inputs to the AND gates 254 and 256 are provided respectively from the inverted and direct output of a divide-by-two flip-flop 258. The divide-by-two flip-flop 258 is toggled by the output of an AND gate 260, which in turn receives on one input the 3 GRI signal and on the other input a feed-back signal which is identified as $\overline{FS\text{-}2\ GRI}$ and which is enabling when there is no found signal in 2 GRI tests.

The $\overline{FS\text{-}2\ GRI}$ signal is also applied as one input to an AND gate 262, along with the 1 KH$_z$ pulses from the master timer. The output of the AND gate 262 is applied as a clock input to 8-bit shift registers 264 and 266, as well as a variable length shift register 268. The D input of the shift register 264 is provided from the Q output of the flip-flop 250. An exclusive OR gate 270 also receives the output of flip-flop 250 as well as the master phase code.

The output shifted from the shift register 264 is applied to the D input of the variable length shift register 268 and its output is in turn applied to the D input of the 8-bit shift register 266. Parallel outputs of the shift registers 264 and 266 are applied to respective master code phase decoders 272 and 274. These decoders are set to recognize the selected master station phase code and provide a corresponding output for either positive or negative polarities at the sampling point. The first and last 4 bits from the decoder 272 are applied to respective digital-to-analog converters 276 and 278, while the first and last 4-bit outputs of phase decoder 274 are applied to respective digital-to-analog converters 280 and 282. The outputs of the digital-to-analog converters 276 and 278 are applied to respective non-inverting inputs of summing amplifiers 286 and 284. In addition, the respective outputs of the digital-to-analog converters 280 and 282 and are applied to non-inverting inputs of summing amplifiers 286 and 284.

The outputs of the amplifier 284, representing a correlation for the first 4 bits in the master phase code for each of the first and second pulse sets 14 and 14' containing that code are applied to a non-inverting input of a comparator 288. An inverting input thereof contains an adjustable positive threshold. The output of the amplifier 284 is also applied to an inverting input of the comparator 290 with a non-inverting input thereof applied from an adjustable negative threshold. The output of the amplifier 286, which represents the correlation with the last 4 bits of the first and second pulse sets 14 and 14' is applied to respective non-inverting and inverting inputs of comparators 292 and 294 with inverting and non-inverting inputs of comparators 292 and 294 provided from adjustable positive and negative thresholds. The outputs of the comparators 288 and 292 which respectively represent an indication that the master signal has been found on both the first and last 4 bits of phase coding in both sets of master pulses and with a positive polarity are applied to an AND gate 296. The positive output thereof indicating a found signal with a positive polarity condition is applied to an OR gate 298. Similarly, the outputs of the comparators 290 and 294 are applied to an AND gate 300 which in combination represents a negative polarity found signal and which applies its output as a second input to the OR gate 298. The output of the OR gate 298 represents the FS-2 GRI signal which indicates that an apparent correlation with the master signal has been found in the 2 GRI first level trial. This output is applied through an inverter 302 to provide the $\overline{FS\text{-}2\ GRI}$ signal applied elsewhere in the circuitry. The output of the AND gate 296 representing a positive polarity master found condition is also applied to one input of an AND gate 306, while the output of the AND gate 300 is also applied as one input of an AND gate 304. The other inputs of the AND gates 304 and 306 are respectively taken from the output and inverted output of the exclusive OR gate 270. The output of the AND gates 304 and 306 are applied to an OR gate 308, whose output is applied to inputs of AND gates 310 and 312. The other inputs of the AND gates 310 and 312 are and respectively the first- and last-half group timing signals. The first- and last-half group timing signals are generated in the master timer as shown in FIG. 11. In FIG. 11, the circuitry of the timer system for generating these signals comprises a three-bit counter 311 responding to the (−) 200 ST signal to provide state output controls in conjunction with the 2 GRI signal to master and slave code tables 313, and 315 respectively. The state output defines the phase code bit provided by each table 313 and 315 for use throughout the system where sequential phase codes are employed. In addition, the most significant bit of counter 311 defines the first, last group timing controls. The output of the AND gates 310 and 312 are applied are applied to respective counter accumulators 314 and 316, which accumulate a predetermined number of misses for the 10 GRI test. The output of these two accumulators 314 and 316 indicating a failure to correlate in at least eight out of forty times during the 10 GRI search and in their absence a confirmation for finding the master phase code is applied through an OR gate 318, 10 GRI clocked flip-flop 321 and inverter 320 to provide the FS-10 GRI confirmation signal representing that the master pulse has been found. The output of the flip-flop indicating the absence of a confirmed signal find is applied to clear the shift registers 264, 266 and 268.

The variable shift register 268 also receives a Loran C rate input signal from the manual entry of that information by the operator. This adjusts the length of the delay provided between registers 264 and 266 representing timing between successive master pulse sets 14 and 14'.

In operation, the master search logic indicated in FIG. 6 provides a correlation through the shift registers 264 and 266, with a delay provided by the variable length shift register 268 to accommodate the time difference between the master pulse sets 14 and 14'. The correlation is provided by the combination of the master phase code and the hard limited RF signal with the hard limited RF signal sampled in quadrature through the flip-flop 250 and AND gates 252, 254 and 256. The correlation indications in decoders 272 and 274 are provided at the outputs of the digital-to-analog converters 276, 278, 280 and 282. Accordingly, if the outputs of both converters 278 and 282 indicate a high positive value representing that the first 4 bits in the two master pulse sets correlate positive, the output of the summing amplifier 284 will be high. Conversely, if they correlate negative, the output of the summer 284 will be negative. The alternative cases provide a positive or negative polarity correlation to the respective AND gates 296 and 300. A similar function is achieved from the outputs of the converters 276 and 280 as applied to summer 286 and, subsequently, through comparators 292 and 294 to indicate positive or negative signal correlation in the last four bits of the searched for master signal.

The indications of positive or negative polarity correlation are applied through the respective AND gates 304 and 306, in conjunction with the non-inverted and inverted output of the exclusive OR gate 270 for the 10 GRI test to indicate by summation through the OR gate 308 the existence of repeated non-correlations or misses for the 10 GRI test. The accumulators 314 and 316 actually accumulate non-correlations over the 10 GRI test and if eight or more failures of correlation are accumulated in either of the accumulators 314 and 316, the indication is that a valid master signal has not been found and the FS-10 GRI signal is applied to the sequencer to recommence the operation of the master search logic indicated in FIG. 6.

Figure 7:
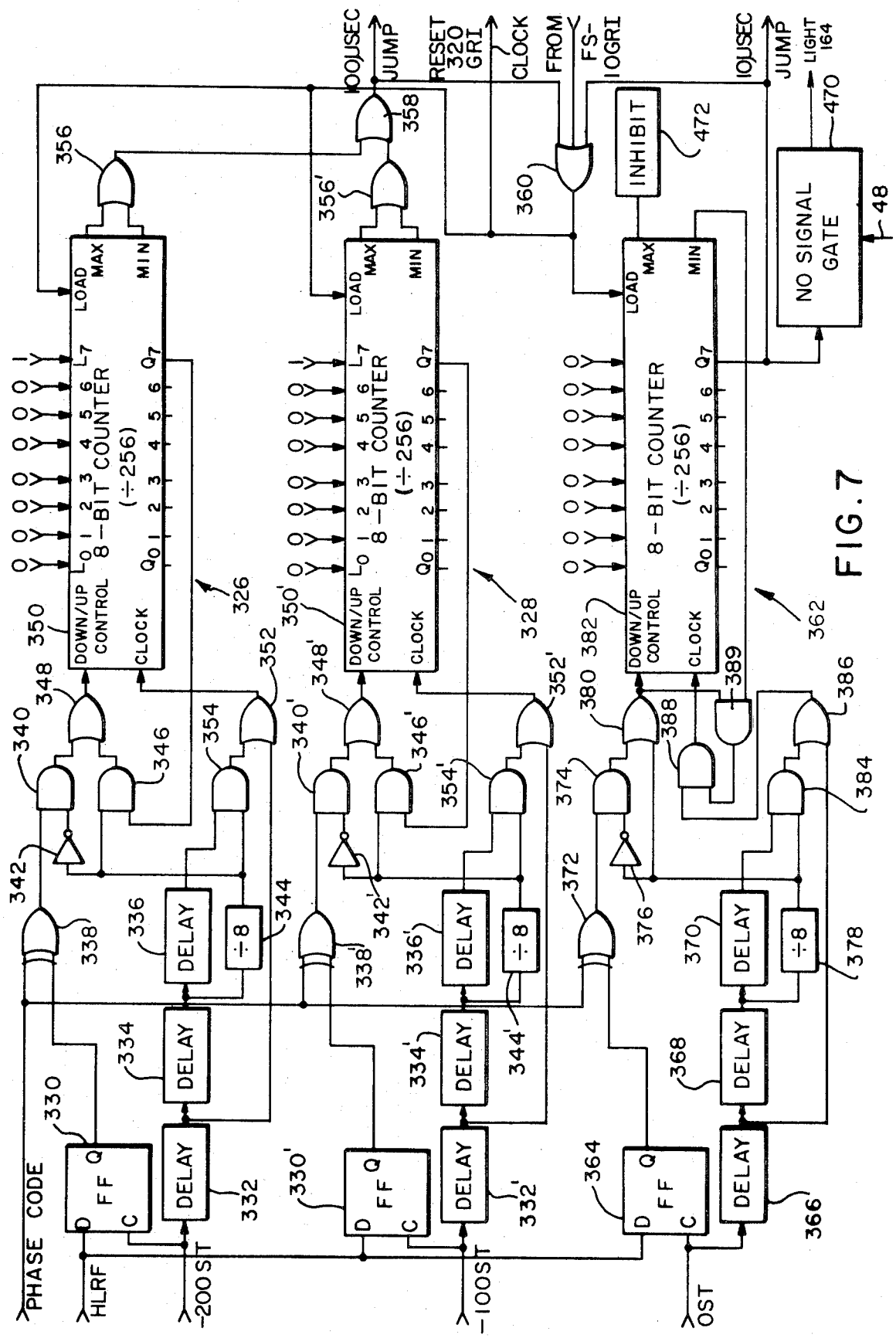
FIG. 7 is a diagram of a front edge and groundwave location logic in FIG. 3.

Assuming that a master signal has been found and confirmed in the respective 2 GRI and 10 GRI tests, and that the timers 102, 104 and 106 have been reset in accordance with these tests, the sequencer 48 is stepped by the FS-10 GRI signal to activate the operation of the FIG. 7 circuitry for location of the groundwave and front edge portions of the received, hard limited RF signal. It will, for purposes of the present discussion, be assumed that the FIG. 7 circuitry is operating on the master signal. Identical circuitry is also employed for the two slave signals in their proper time sequence with the sequencer 48 operative to apply the 10 and 100 microsecond jump signals to the respective slave timers instead of the master timer as will be the case in this description. Conventional sequencing concepts are employed for this function within the sequencer 48. corresponds The groundwave and front edge location functions of the system 110 are shown in detail in FIG. 7. In particular, the (−) 200 ST and the (−) 100 ST signals are applied to similar count accumulation systems to indicate if a correlation of coherent signals exist at these advanced signal sampling times, in which case timing is advanced until positive signal identification is no longer found at these times. It will then be known that the zero sampling time is within 100 microseconds of the leading edge of each pulse. Substantially, identical circuitry 326 and 328 is employed for the 200 and 100 microsecond advance sampling times and they comprise flip-flops 330 and 330' in respective circuits which receive on D inputs the hard limited RF signal. Clocking of each flip-flop 330 and 330' is provided from respective (−) 200 ST and (−) 100 ST sample signals from the master and slave timers 102, 104 and 106, as appropriate. Both the (−) 200 and (−) 100 ST signals are applied to a chain of typically 1 microsecond delay circuits 332, 334 and 336, and 332', 334' and 336', in each of the circuits 326 and 328. The Q outputs of the flip-flops 330 and 330' are applied to respective first inputs of exclusive OR gates 338 and 338' which in turn receive on second inputs the phase code signal generated in the respective timers. The outputs of the exclusive OR gates 338 and 338' are applied as respective first inputs of AND gates 340 and 340'. Second inputs of the AND gates 340 and 340' are applied through inverters 342 and 342' from divide-by-eight circuits 344 and 344', which in turn receive the output of the delay circuits 334 and 334'. The output of the divide-by-eight circuits 334 and 334' is also applied as one input of AND gates 346 and 346'. The outputs of the AND gates 340 and 340', and 346 and 346', are applied to OR gates 348 and 348' are applied to down-up controls of 8-bit counters 350 and 350' each. Counters 350 and 350' provide a total count of 256. The 8-bit counters 350 and 350' have parallel load inputs which load them with a binary one in the most significant bit to preset the intermediate value of 128 for each counter. The most significant bit output of the counters 350 and 350' is fed back as a second input of the AND gates 346 and 346'. A clock input for the counters 350 and 350' is provided from the output of OR gates 352 and 352' as clocking inputs. OR gates 352 and 352' have respective first and second inputs from AND gates 354 and 354' and the output of the delay circuits 332 and 332'. The AND gates 354 and 354' receive on respective first and second inputs the output of the delay circuits 336 and 336' and divide-by-eight circuits 334 and 334'.

The counters 350 and 350' have output signals representing minimum and maximum counts which are summed though respective OR gates 356 and 356', and the outputs of these gates are combined in a single OR gate 358 to provide the 100 microsecond jump signal for application to the respective master and slave timers. The counters 350 and 350' are reinitialized through their load inputs to the median count of 128 through a signal from an OR gate 360 which, in turn, receives three inputs, one from the 100 microsecond jump signal output of the OR gate 358, a start groundwave and front edge location operation signal from sequencer 48, as well as a 10 microsecond jump signal from the front edge location circuitry 362 to be described below.

The circuits 326 and 328 begin processing at the median value of the counters 350 and 350' to count for 320 GRI as defined by the 320 GRI signal from the divider 248 in the timers. Eight samples are taken each GRI due to the timing of the (−) 200 and (−) 100 ST signals which correspond to the eight pulses in each station transmission during a single GRI. When the hard limited RF signal at each sample is detected as having, for example, a positive polarity the counters 350 and 350' count whereas a negative polarity causes the counters to count down. The circuitry also provides a bias of one count for every eight samples which must be overcome for the counters 350 and 350' to make any progress. If a consistent polarity is detected at each sample during the 320 GRI sampling interval at eight (−) 200 or (−) 100 ST, the counters 350 or 350' will eventually reach the maximum or minimum count and trigger the 100 microsecond jump in the timers to a more advanced sampling point. When no coherent signal is detected at these advanced sampling points, the 10 microseconod advance sampling of the front edge location system 362 assumes control over the synchronization of the timers.

The front edge locator includes a flip-flop 364 which receives the hard limited RF signal on a D input and the zero ST sampling signal on a clock input. A delay chain of delay circuits 366, 368 and 370 also respond to the zero ST signal. The Q output of the flip-flop 364 is applied to an exclusive OR circuit 372 with the phase code, and its output is applied as one input of an AND gate 374. A second input of the AND gate 374 is applied through an inverter 376 from the output of a divide-by-eight circuit 378, which in turn receives the output of the delay circuit 368. An OR gate 380 receives on one input the output of AND gate 374 and on a second input the output of the divide-by-eight circuit 378. The output of OR gate 380 is applied as an up-down control to an eight-bit counter 382. The outputs of the delay circuit 370 and the divide-by-eight circuit 378 are applied as respective inputs to an AND gate 384 and its output is applied as one input of an OR gate 386 along with the output of the delay circuit 366 as the second input to the gate 386. The output of the gate 386 is applied as one input to an AND gate 388 with the second input thereof taken from a NAND gate 389 which AND's the minimum count output of the counter 382 and the output of OR gate 380. The most significant bit of the counter 382 is taken as the output for the 10 microsecond jump indication. The counter 382 is jam loaded by a signal from the OR gate 360 to an all-zeros condition. Since the tracking time for the Loran receiver is (+) 7.6 ST, consistent coherent dectection of signals over the 320 GRI interval at the 0.0 ST sampling time provided by the circuitry 362 is an indication that the timer, master or slave, may be advanced an additional 10 microseconds.

The output of the OR gate 360 is also taken as a reset for the 320 GRI clock 248 each time a timer advance is accomplished.

At this point in signal processing, the master and slave timers will be synchronized to initial portions of each transmitted pulse where it is assumed that skywave interference is substantially absent and where it may be possible to accurately track on a specific portion of a specific cycle of carrier signal in each pulse. The actual synchronization to the tracking point is accomplished by the FIG. 8 circuitry which incorporates the envelope deriver 94, hard limiting amplifier 96, and third cycle locators 98 of FIG.3.

Figure 8:
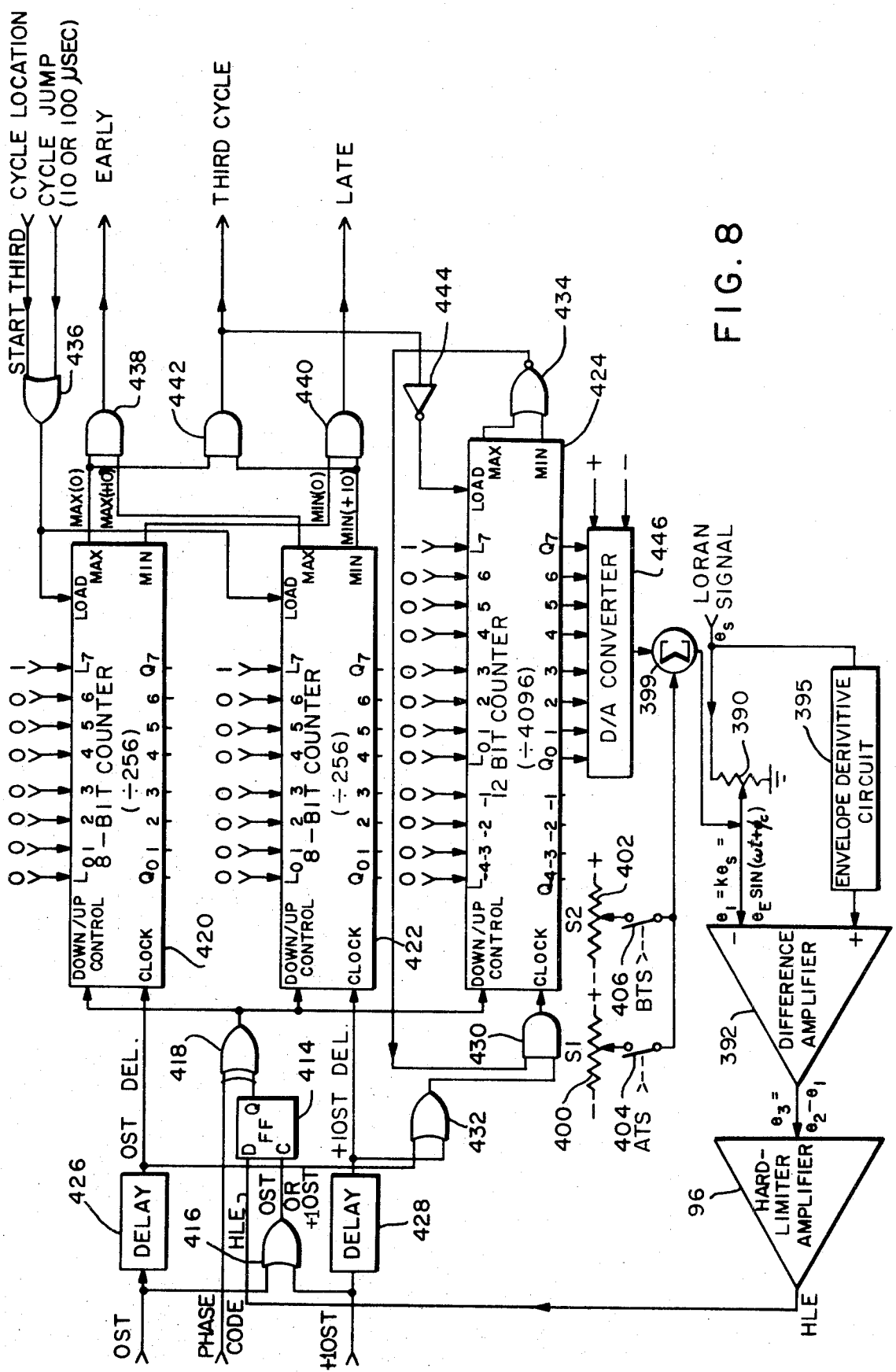
FIG. 8 is a diagram for third cycle location logic according to FIG. 3.
Figure 8A:
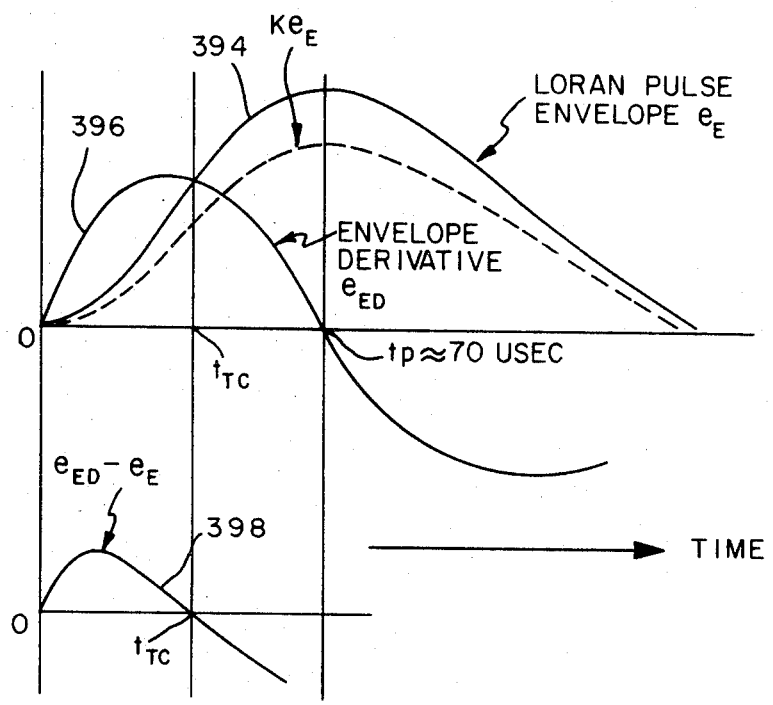
FIGS. 8A and 8B being associated waveforms.

Referring to the bottom of FIG. 8, the Loran signal at the output of the active bandpass filter 80 is applied through a potentiometer 390 to an inverting input of a difference amplifier 392, and in parallel through a differentiating circuit 395 to a non-inverting input of the same difference amplifier 392. FIG. 8A shows in curve 394 the envelope of the signal applied to the inverting input of difference amplifier 392 and in curve 396 the derivative signal applied to the non-inverting input. The output signal is shown as curve 398 in FIG. 8A and is indicated as having a zero crossing which may be varied by the potentiometer 390.

Figure 8B:
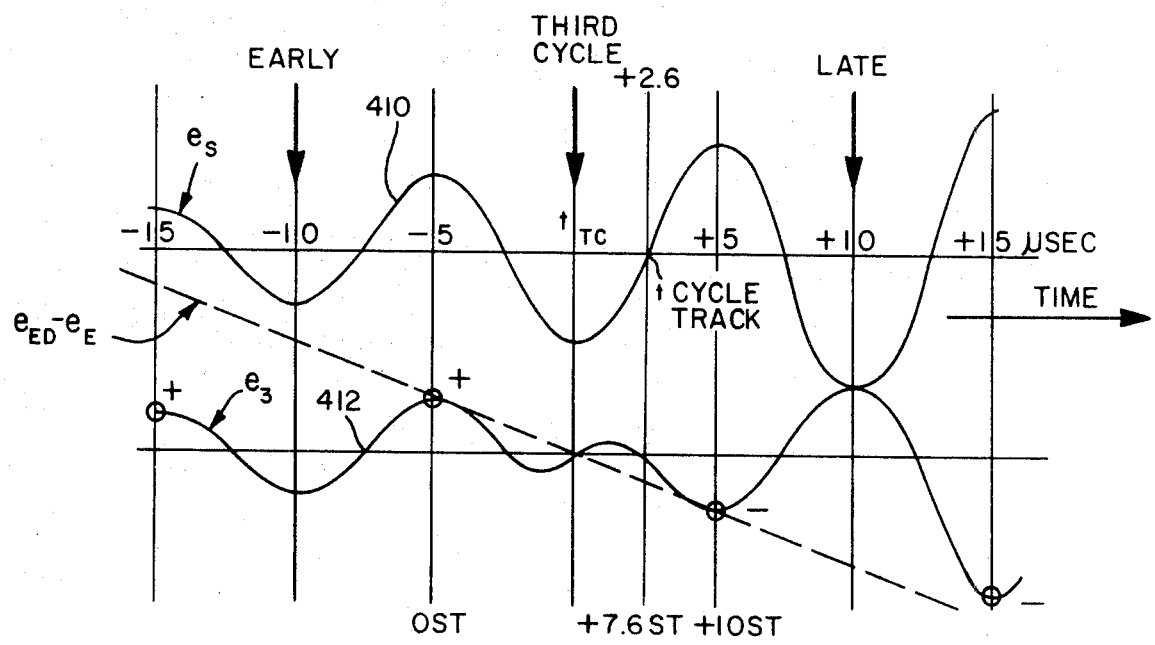

In particular, the potentiometer 390 is controlled, as a gain factor for the magnitude of curve 394 separately for the master and two slave signals. In particular, the master control is provided as the output of a digital-to-analog converter 446, to be described below, through aa summer 399, while the two slave signals controls are provided from selected potentiometers 400 and 402 located on the front panel to summer 399. Single pole switches 404 and 406 selectively apply corrections from potentiometers 400 and 402 to summer 399. FIG. 8B represents, in expanded scale, the carrier cycle waveforms which result from the differencing of the carrier and carrier having the envelope derivative in amplifier 392. In FIG. 8B, a curve 410 indicates the carrier waveform during the early portion of each pulse, and having a growing magnitude. Curve 412 represents the carrier signal resulting at the output of the difference amplifier 392 and indicates a phase reversal, with an extra zero crossing, or extra cycle, within the cycle between 0.0 ST and (+) 10 where the envelope signal of curve 398 in FIG. 8A crosses through zero. Reference to these waveforms in the description will facilitate an understanding of the sampling circuitry which is employed to synchronize tracking to a predetermined cycle and predetermined point on that cycle in each of the master and slave pulses received.

For this purpose, the output of the difference amplifier 392 is applied through the hard limiting amplifier 96 to the D input of a flip-flop 414. The clock input for the flip-flop 414 is provided from the output of an OR gate 416 which in turn receives on first and second inputs the 0.0 ST and (+) 10 ST pulses from appropriate timers. The Q output of the flip-flop 414 is applied as one input to an exclusive OR gate 418 and the other input of the exclusive OR gate 418 is the phase code for the station being tracked. The output of the exclusive OR gate 418 is applied as an up-down control to three counters including an eight-bit counter 420, eight-bit counter 422, and 12-bit counter 424. The clock inputs for the counters 420 and 422 are provided respectively from the outputs of typically 1 microsecond delay circuits 426 and 428, which in turn respectively respond to the 0.0 and (+) 10 ST signals. The clocking for the twelve-bit counter 428 is provided from the output of an AND gate 430, which in turn receives on one input the output of an OR gate 432. Gate 432 combines the output of delay circuits 426 and 428. A second input of the AND gate 430 is provided from an inverting output of an OR gate 434, which in turn receives first and second inputs from the maximum and minimum count indications of the 12-bit counter 424.

The counters 420 and 422 are jam loaded to the intermediate count 128 by the output of an OR gate 436, which in turn receives on first and second inputs a third cycle start signal from the sequencer 48 as well as the 10 or 100 microsecond jump signals. Each time that there is a known cycle jump, a new decision process is initiated.

The maximum count indication outputs of the counters 420 and 422 are applied as inputs of an AND gate 438, and the output of AND gate 438 provides a signal indicating that tracking is occurring early with respect to the desired 3rd cycle tracking point. The minimum count indicating outputs of the counters 420 and 422 are applied to an AND gate 440, which in turn provides an output signal indicating late tracking. The maximum count from the counter 420 and minimum count from the counter 422 are applied as inputs to an AND gate 442 and its output is an indication of tracking at the appropriate point. This output of gate 442 is also applied through an inverter 444 to the load input of counter 424 causing it to be reinitiated to the intermediate count of 2,048. The 8 most significant bit outputs of the counter 424 are applied to a dual polarity digital-to-analog converter 446. The output of the digital-to-analog converter 446 is used as a fine tuning control over the potentiometer 390 to vary the point of envelope zero signal crossing on the curve 398 and accordingly to provide a fine tuned control for the master envelpe detection. As was indicated previously, the fine control over the tracking of the slave timers is provided through the potentiometers 400 and 402 located on the front panel which are manually set by the operator in view of specific information as available. These controls can also be achieved automatically as shown in FIG. 10.

It is to be noted that the early and late signals on the outputs of the AND gates 438 and 440 are employed to jump the timers plus or minus 10 microseconds. Accordingly, similar circuitry employing counters such as 420 and 422 and associated driving circuitry is employed for the master and each of the slave timers of the receiver. These provide a gross cycle identification within 10 microseconds of the tracking point of the timers. The fine tracking adjustment provided by the control over the potentiometer 390 is provided only for the master signals, the slave signals being as indicated above controlled by manual adjustment as additions to the master control signal.

The philosophy of the third cycle location system is an accumulation over a predetermined time period to indicate whether the timers are tracking early, late, or within the time period defined by the 0.0 ST to (+) 10 ST period of curve 412 in FIG. 8B. In particular, consistent early tracking, when taking sample signals at 10 microsecond intervals as provided by the 0.0 ST and (+) 10 ST signals will produce a consistent positive polarity count control applied to both counters 420 and 422, driving them toward a maximum count extreme point and resulting ultimately in activation of the AND gate 438. Similarly, late tracking will result in consistent accumulation in the negative direction which will trigger the AND gate 440 to provide an indication of late tracking. The feedback loop correction using counter 424 is automatically achieved by employing the early (0.0 ST) or late ((+) 10 ST) signals to incrése or decrease the count in the counter 424 until the net up and down counts are equal.

It can thus be seen that the master envelope control will adjust one HLE envelope signal to zero 2.6 microseconds before the selected cycle zero crossing. The same adjustment is also applied to the slave envelopes. The fine control on the master tracking is initialized after location of the third cycle and corresponding activation of the AND gate 442 for the master. At this point, very accurate and precise tracking of the master envelope signal has been achieved.

It is now necessary to adjust the timing of the slave timers for more accurate and precise synchronization with the received slave signals to provide accurate data output from the timers. To this end, FIG. 9 logic is employed, and may typically be conceived as contained within each of the slave timers 104 and 106 in FIG. 3. In particular, in FIG. 9, the phase code for the slave stations being monitored is applied as one input to an exclusive OR gate 450, with the second input provided from the Q output of a flip-flop 452, which is driven by the hard-limited RF signal and clocked by the (+) 7.6 sample. The (+) 7.6 ST sample signal is also applied through a 1 microsecond delay circuit 454 to inputs of respective AND gates 456 and 458. The output of the exclusive OR gate 450 is applied as a second input of the AND gate 456 and, through an inverter 460, to the second input of the AND gate 458. The outputs of the AND gates 456 and 458 are applied to respective 4-bit counters 462 and 464 as clock inputs. The counters are hardwired to count on each clock pulse. The outputs of the counters 462 and 464 are taken as 0.1 microsecond advance and retard signals respectively for application to the slave pulse add and pulse subtract circuits 200 and 202 in the slave timers. The net result of the circuitry of FIG. 9 as can be seen from viewing FIG. 8A is to advance or retard the slave timers by 0.1 microseconds when the 0.0 ST and (+) 7.6 ST signals accumulate samples of either similar polarities or opposite polarities. Only when the (+) 7.6 ST sampling is at a zero signal level will no advance or retard signal occur. In practice, a hunting effect may occur with a maximum deviation of 0.1 microseconds around the desired tracking point.

Figure 13:
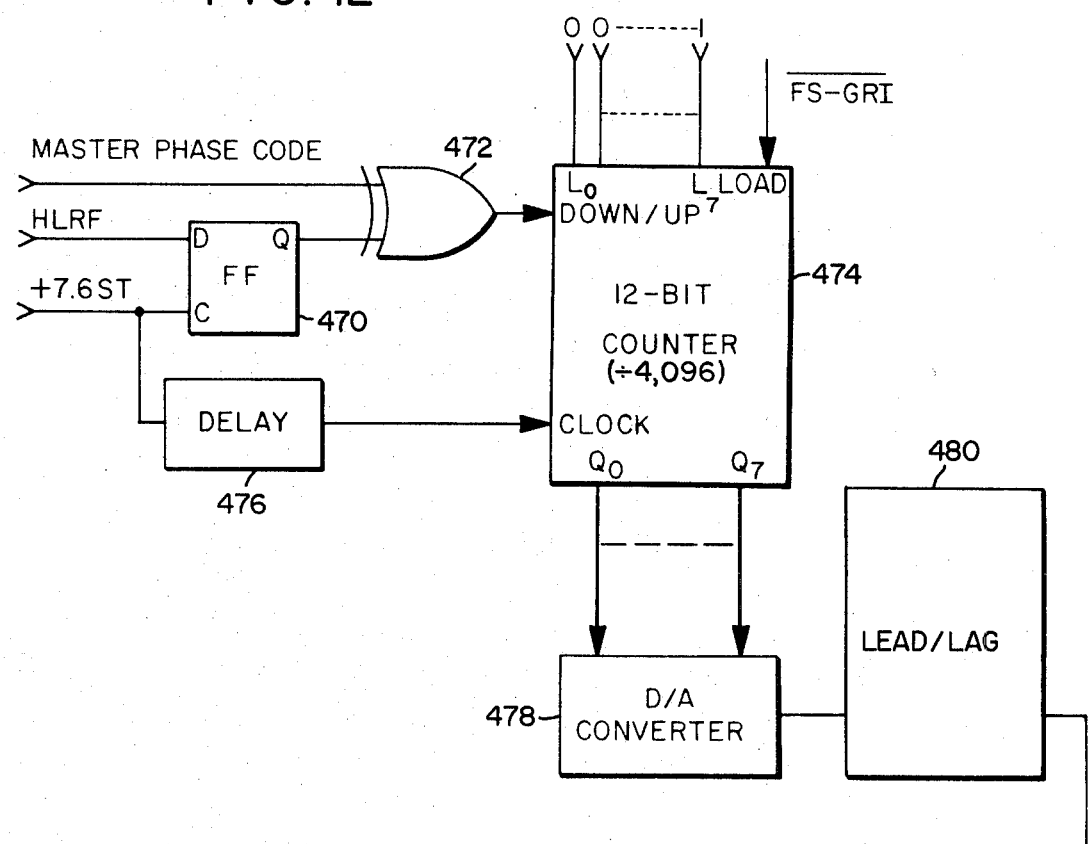
FIG. 13 is a diagram of a master cycle tracking and oscillator stabilizer for use with the receiver.

Cycle tracking of the master signal third cycle zero crossing is provided by the FIG. 13 circuitry which operates as a phase lock on the oscillator 100 for tracking as well as to improve its stability. In FIG. 13, the HLRF signal is applied as a data input to a flip-flop 470 which is clocked by the (+) 7.6 ST signal. The output of the flip-flop 470 is applied to an exclusive OR gate 472 along with the master phase code from the master timer. The output of the OR gate 472 operates a count up-down control of a twelve-bit counter 474 which is clocked by the (+) 7.6 ST signal through a 1 microsecond delay 476. The counter 474 is loaded to an intermediate count by the $\overline{FS\text{-}10\ GRI}$ signal. The parallel output of the counter 474 represents receiver velocity or oscillator drift and is applied to a digital-to-analog converter 478 from which the analog output is applied to a lead-lag network 480 for damping and then through a constant gain amplifier 482 to the frequency control of oscillator 100.

At this point, tracking is accurate and the sequencer 48 may apply to the outputs of the timers 102, 104 and 106 as start and stop signals to the counter 150 to provide indications of the received variations in time intervals between the master and slave signals. The time variation indication is provided in the ouput display 156 and will define a line of position for the particular master and slave being sampled. Electrical output as well as visual display of time difference information are normal receiver outputs.

Figure 12:
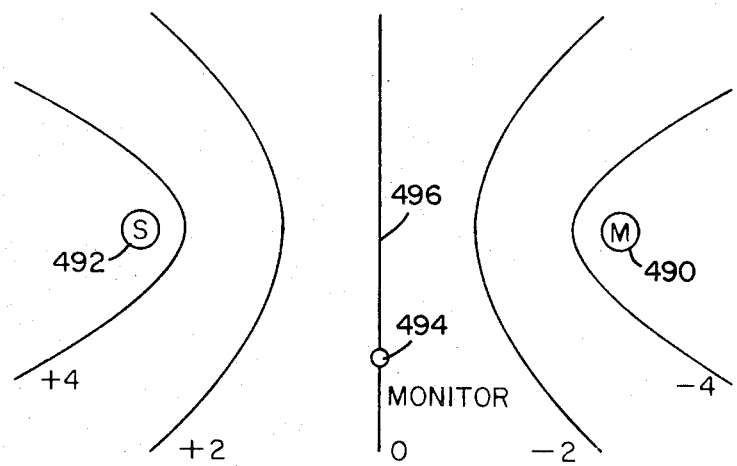
FIG. 12 is a hyperbolic plot of typical envelope-cycle discrepancies for use in the receiver.

FIGS. 10 and 12 illustrate the manner in which the receiver compensates for variations between desired envelope and cycle zero crossing at different locations throughout the converage of a Loran C master-slave system. This variation due to differences between group and cycle delay is plotted in FIG. 12 as hyperbolic lines of constant variation for one master 490 and slave 492. The variation which is obtained mathematically or by actual measurement can be seen to approach 10 microseconds over the area of FIG. 12. Maps such as shown in FIG. 12 are provided for the areas of use for the receiver. Typically, a monitor station 494 controls the time of the master and slave stations for zero discrepancy on the base line 496 although it is possible that the monitor be located at a different point. The operator, knowing his approximate position, can select the appropriate discrepancy value to set on the control 400 or 402 for the corresponding slave station. The presetting of this value minimizes the possibility for cycle tracking the wrong cycle.

Alternatively, the discrepancy correction can be automated as shown in FIG. 10 where the output of counter 150 representing position is applied to a constant offset circuit 498 to produce a data output corresponding to the FIG. 12 discrepancy plots which are based on position. A digital-to-analog converter 500 responds to the offset circuit 498 to produce an automatic adjustment on control 400.

A final element of the Loran receiver is the signal-to-noise detector which operates with the circuitry for front edte location but whose operation is triggered in the wideband tracking mode whereas the front edge location as well as the other acquisition logic occurs in the narrowband mode by the appropriate state of the sequencer 48. For this purpose, a no signal gate 470 in FIG. 7 receives the 10 microsecond jump signal output of the most significant bit of counter 382 for application to the no signal light 164 which is shown in FIG. 3. The maximum output of the counter 382 is applied to an inhibit gate 472 which permits only count-down inputs to the counter 382 so that overflow from MAX to zero to recommence counting of the counter 382 is avoided. In this case a walk just below the maximum count value of the counter 382 is achieved. As indicated above, a down count bias of one count in every eight samples is provided which must be overcome to produce a change in the counter 382.

Having described above the preferred embodiment for the present invention, it will occur to those skilled in the art that various modifications and alterations to the disclosed system may be achieved without departing from the spirit of the invention. Accordingly, it is intended to limit the scope of the invention only as indicated in the following claims. It is apparent, for example, that Loran systems other than Loran C, such as Loran D, may employ the invention.

What is claimed is:

1. For use with Loran receiver, apparatus for limiting the effect of the envelope-cycle discrepancy of received Loran transmissions comprising:
   means for receiving Loran signals corresponding to Loran pulse transmissions:
   means responsive to received Loran signals for identifying a point on the pulse envelope;
   means operative in response to a control for adjusting the identified point on the envelope for received signals from at least one Loran slave stations;
   means responsive to the identified point and responsive to carrier cycles in the received Loran signals for identifying a predetermined carrier cycle point which bears a predetermined relationship to the identified envelope points; and
   means for indicating an adjustment in the control for the identified envelope point in response to known position with respect to the location of the Loran stations whose transmissions are being received.

2. The apparatus for limiting envelope-cycle discrepancy of claim 1 wherein the identified cycle point having said predetermined relationship is the cycle zero crossing point closest to the identified envelope point.

3. The apparatus for limiting envelope-cycle discrepancy of claim 1 wherein:
   said means for indicating an adjustment includes a map having generally hyperbolic lines of constant envelope-cycle discrepancy for at least a master and slave station thereon;
   said control being operator adjustable in accordance with the envelope-cycle discrepancy for a selected location on said map.

4. The apparatus for limiting envelope-cycle discrepancy of claim 1 wherein said Loran receiver has an output indication of at least a line of position with respect to two Loran stations and further wherein:
   said means for indicating an adjustment includes means responsive to said output indication for providing a corresponding control signal; and
   means are provided for automatically responding to said control signal to provide the corresponding control of said means for adjusting the identified point.

5. The apparatus for limiting envelope-cycle discrepancy of claim 1 wherein said means for identifying a point on the pulse envelope includes means for identifying that point generally independent of received signal amplitude.

6. The apparatus for limiting envelope-cycle discrepancy of claim 5 wherein said means for identifying said point further includes:
   means for generating a signal representative of the difference between the envelope and the time derivative of the envelope of said received signal to provide a difference signal; and
   means for detecting a predetermined amplitude of said difference signal to identify said point.

7. The apparatus for limiting envelope-cycle discrepancy of claim 6 wherein said adjusting means includes means for varying said difference signal in response to said control.

8. The apparatus for limiting envelope-cycle discrepancy of claim 6 wherein said control has a front panel setting for said receiver and data is provided to correlate control setting with geographic position.

9. The apparatus for limiting envelope-cycle discrepancy of claim 6 further including means for varying said difference signal to produce time coincidence in the identification of said predetermined carrier cycle point and the detected amplitude of said difference signal.

10. The apparatus for limiting envelope-cycle discrepancy of claim 9 wherein:
    said varying means includes means for varying said difference signal for a master station received signal; and
    said control includes means for producing a further variation in said difference signal for a slave station received signal in addition to the variation for said master station received signal.

11. The apparatus for limiting envelope-cycle discrepancy of claim 10 wherein said means for producing a further variation includes means for combining said variation with said further variation.

12. The apparatus for limiting envelope-cycle discrepancy of claim 10 wherein said receiver provides an output indication of at least a line of position and means are provided automatically operative in response to said output indication to activate said means for producing a further variation for producing a corresponding further variation.

13. For use in a Loran receiver which provides output position data, apparatus for limiting the effect of the envelope-cycle discrepancy of received Loran transmissions comprising:
    means for receiving Loran signals corresponding to Loran pulse transmissions from a master and one or more slave stations;
    means responsive to the received signals for providing a carrier representing signal;
    means responsive to the received signals for providing an envelope signal; m means for detecting a point on said envelope signal as a function of the time of reception of said pulse transmissions and generally independent of received amplitude;

means for tracking a point on the cycles of said carrier signal which corresponds by a set time relationship to the detected point on said envelope signal for signals received from said master and one or more slave stations;

means for adjusting the detected envelope point for master and slave envelope signals to produce a futher predetermined relationship between the detected point and the tracked point for received signals from one of said master and slave stations;

means for adjusting the detected envelope point for the other of said master and slave stations in response to an adjustable control; and means for providing an indication of the adjustment of said control as a function of said output position data.

14. The apparatus for limiting envelope-cycle discrepancy of claim 13 wherein said indicating means includes a map marked to show an adjustment in said control as a function of geographic position specified by said output position data.

15. The apparatus for limiting envelope-cycle discrepancy of claim 13 wherein said indicating means includes a feedback control for adjusting said adjustable control in response to said output position data whereby said detected and tracked points for each master and slave stations generally maintain said further predetermined relationship.

16. For use in a Loran receiver which provides output position data, a method for limiting the envelope-cycle discrepancy of received Loran transmissions comprising the steps of:

receiving Loran signals corresponding to Loran pulse transmissions from a master and one or more slave stations;

providing a carrier representing signal in response to the received signals;

providing an envelope signal in response to the received signals;

detecting a point on said envelope signal as a function of the time of reception of said pulse transmissions and generally independent of received amplitude;

tracking a point on the cycles of said carrier signal which corresponds by a set time relationship to the detected point on said envelope signal for signals received from said master and one or more slave stations;

adjusting the detected envelope point for master and slave envelope signals to produce a further predetermined relationship between the detected point and the tracked point for received signals from one of said master and slave stations;

adjusting the detected envelope point for the other of said master and slave stations in response to an adjustable control; and providing an indication of the adjustment of said control as a function of said output position data.

* * * * *

UNITED STATES PATENT OFFICE
CERTIFICATE OF CORRECTION

PATENT NO. : 3,868,690
DATED : February 25, 1975
INVENTOR(S) : Herbert E. Miller It is certified that error appears in the above-identified patent and that said Letters Patent are hereby corrected as shown below:

Column 2, line 48, "pulsed" should read --pulses--.

Column 2, line 48, "times" should read --time--.

Column 7, line 25, "characterisitcs" should read --characteristics--.

Column 8, line 8, "jump jump" should read --jump signal--.

Column 10, line 36, "are applied are applied" should read --are applied--.

Column 11, line 42, "48. corresponds" should read --48.--.

Column 12, line 10, "348' are" should read --348' are in each system and the output of OR gates 348 and 348'--.

Column 12, line 51, "count" should read --count up--.

Column 12, line 63, "microseconod" should read --microsecond--.

continued.......

UNITED STATES PATENT OFFICE
CERTIFICATE OF CORRECTION

PAGE TWO

PATENT NO. : 3,868,690
DATED : February 25, 1975
INVENTOR(S) : Herbert E. Miller It is certified that error appears in the above-identified patent and that said Letters Patent are hereby corrected as shown below:

Column 13, line 26, "dectection" should read --detection--.

Column 13, line 49, "showns" should read --shows--.

Column 13, line 63, "aa" should read --a--.

Column 14, line 8, "(+) 10 where" should read --(+) 10 ST where--.

Column 14, line 31, "0.0 and" should read --0.0 ST and--.

Column 15, line 38, "increse" should read --increase--.

Column 15, line 59, "(+) 7.6" should read --(+) 7.6 ST--.

Column 16, line 48, "converage" should read --coverage--.

Column 16, line 59, "knowning" should read --knowing--.

Column 17, line 7, "edte" should read --edge--.

Column 18, line 68, "signal; m" should read --signal;--.

Signed and Sealed this sixth Day of April 1976

[SEAL]

Attest:

RUTH C. MASON
Attesting Officer

C. MARSHALL DANN
Commissioner of Patents and Trademarks